May 21, 1968     W. B. HARPMAN     3,384,122

SELF-CLEANING POPPET SPOOL VALVE

Filed July 12, 1965

INVENTOR.
WEBSTER B. HARPMAN

United States Patent Office 3,384,122
Patented May 21, 1968

3,384,122
SELF-CLEANING POPPET SPOOL VALVE
Webster B. Harpman, Youngstown, Ohio, assignor to Kingsley A. Doutt, Alpena, Mich.
Filed July 12, 1965, Ser. No. 471,027
5 Claims. (Cl. 137—625.64)

ABSTRACT OF THE DISCLOSURE

More particularly, the invention relates to a four-way self cleaning air valve having a single inlet port. The spool carrying the valves is supported at its ends by diaphragms which reciprocate the spool axially thereof through an air pressure controlled pilot valve. The valve elements carried by the spool have diammetrically positioned spherical surfaces which operate between pairs of valve seats.

---

This invention relates to an air valve and more particularly to a self-cleaning air valve wherein the valve elements are engaged in the manner of a spool valve and so formed to act in the manner of a poppet valve.

The principal object of the invention is the provision of a self-cleaning poppet spool air valve which may be of the four-way type.

A further object of the invention is the provision of an air valve incorporating novel valve elements and means for moving the same relative to self-cleaning seats.

A still further object of the invention is the provision of an air valve incorporating a main valve and a pilot valve for controlling the operation thereof.

A still further object of the invention is the provision of an air valve incorporating a floating spool having resilient valve elements thereon which are self-aligning with respect to the valve seats in said air valves.

A still further object of the invention is the provision of an air valve that can be mounted in any one of a number of positions and wherein the inlet and exhaust ports can be located in any one of a number of positions.

The air valve disclosed herein may be accurately described as a poppet spool valve inasmuch as the pilot and main valve portions thereof incorporate novel valve elements comprising resilient spheres positioned and self retaining on floating spools and movable thereby into and out of sealing engagement with appropriately shaped valve seats which become selfcleaning and so arranged that dirt cannot jam the same. In controlling air cyclinders or other air operated devices as commonly used in industry for actuating machine tools and the like, air valves are frequently employed, and heretofore such valves have had the common difficulty of being subject to jamming and sticking in operation due to the dirt in the air lines controlled by the valves. In large industrial plants, wherein such valves are customarily found in large numbers the compressed air for actuating the air operated devices comes from compressed air sources through considerable piping, and the compressed air is usually contaminated through the inclusion of dirt, scale, oil and the like, which heretofore has adversely affected the operation of the control valves.

The present invention relates to an improved air valve, particularly adapted for controlling air operated devices such as air cylinders as applied to machine tools and the like and wherein the air valve and its pilot operating valve are so formed as to be operative regardless of the presence of dirt, oil, scale or other contaminants in the air supply. The invention is disclosed in a four-way valve.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
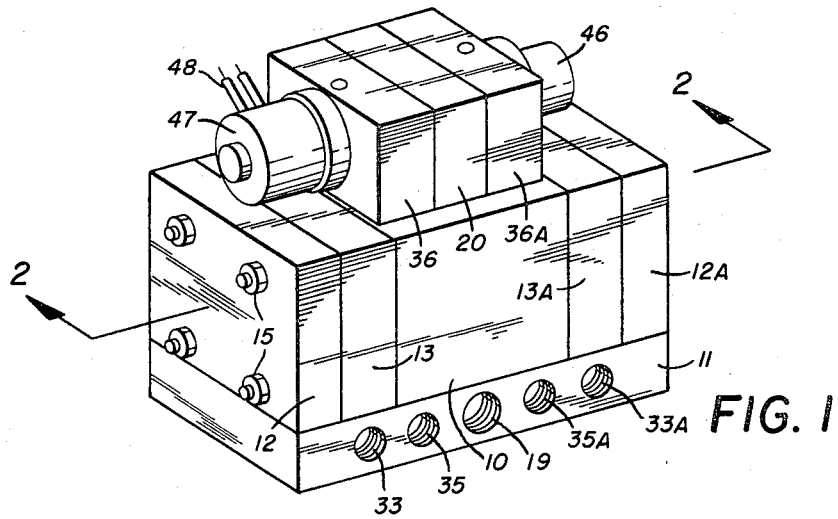
FIGURE 1 is a perspective view of the four-way air valve.

By referring to the drawings and FIGURE 1 in particular, it will be observed that the improved four-way air valve disclosed herein is so formed that it may be mounted in desired location with the exhaust ports in any one of a number of desirable positions, and that the pressure inlet ports and the exhaust ports may be alternately operative on either side of the valve and the valve itself turned or rotated so as to make it very convenient to install in connection with air cylinders to be controlled thereby.

In FIGURE 1 of the drawings, the four-way air valve comprises a central body member 10, a base 11 and a pair of diaphragm chamber forming body members 12 and 12A and 13 and 13A, respectively, positioned on the opposite sides of the central body member 10. The several body members 10, 11, 12, 12A, 13 and 13A are assembled in sealing relation through the inclusion of a plurality of O-ring gaskets which are generally indicated by the numeral 14, and the several body members 10, 11, 12, 12A and 13, 13A are secured to one another by customary means, such as tie rods and fasteners, as generally indicated by the numeral 15. Alternately, the several body members may be bolted to one another as will occur to those skilled in the art. The central body member 10 has a transverse passageway 16 therethrough with oppositely disposed, outwardly facing annular valve seats 17 and 17A spaced inwardly with respect to the opposite sides of the central body member 10.

A transverse communicating passageway 18 extends through the central body member 10 and its lowermost end communicates with an air inlet passageway 19 in the base member 10 of the four-way air valve. The uppermost portion of the transverse communicating passageway 18 communicates with a central portion 20 of the pilot valve assembly which is positioned on the four-way air valve and which serves to actuate the same as hereinafter described. The central portion 20 has a transverse passageway 21 therein with integral annular valve seats 22 and 22A, respectively, formed on the ends of a transverse passageway 21.

Figure 2:
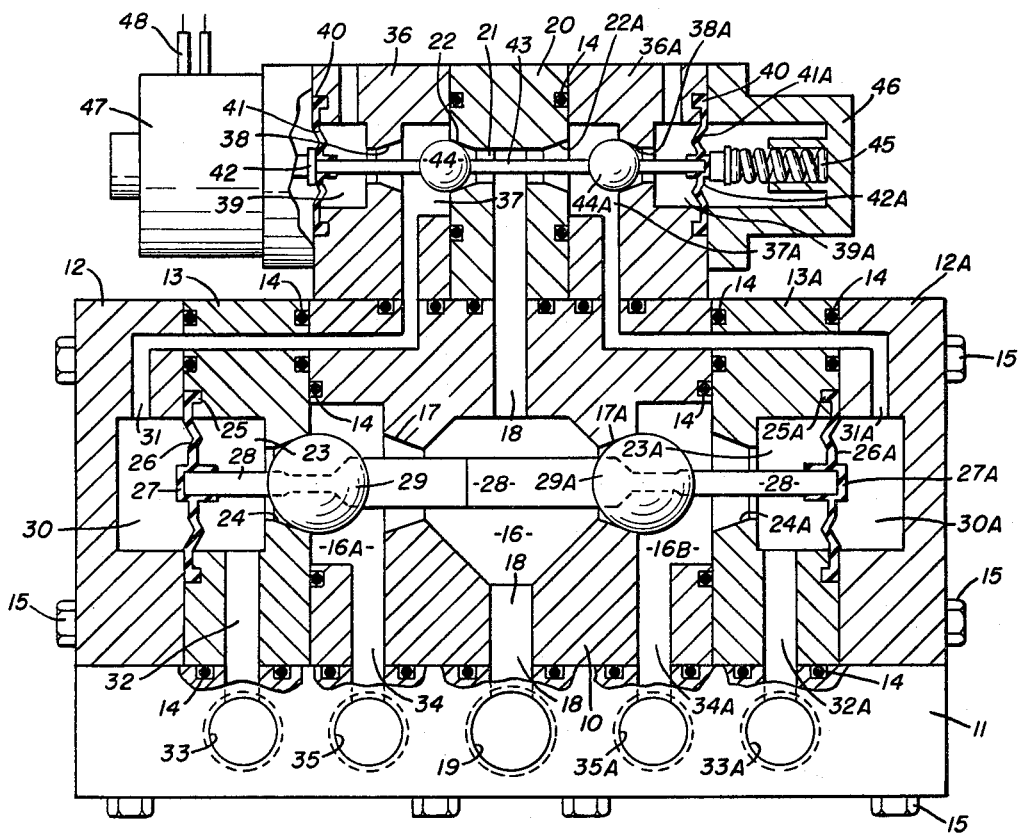
FIGURE 2 is an enlarged vertical section on line 2—2 of FIGURE 1.

Still referring to FIGURE 2 of the drawings, it will be seen that the body members 13 and 13A are positioned immediately adjacent the sides of the central body member 10 and have transverse passageways 23 and 23A therein which extend into and communicate with annular valve seats 24 and 24A, respectively, and which annular valve seats 24 and 24A are conical with their widest ends adjacent the central body member 10 and the extensions 16A and 16B of the transverse passageway 16 therein. The opposite outer sides of the body members 13 and 13A have annualr grooves 25 and 25A therein, and receive and retain the peripheral edges of diaphragms 26 and 26A which have central cups 27 and 27A to receive the opposite ends of a two-part spool or spindle 28. Each of the two parts of the spool 28 has an area of reduced diameter inwardly of the ends thereof and polyethylene spheres 29 and 29A having passageways therethrough of a configuration similar to that of the reduced diameter areas of the spindle 28 are positioned on the spindle 28 in registry with the reduced areas of diameter.

It will thus be seen that the spool floats in position longitudinally of the passageways 16, 16A and 16B and extends through the passageways 23 and 23A and operatively positions the polyethylene spheres 29 and 29A adjacent the oppositely disposed annular conical shaped valve seats 17 and 17A, and 24 and 24A, respectively, so that longitudinal movement of the spindle 28 will alternately position the polyethylene spheres 29 in these oppositely disposed valve seats.

Still referring to FIGURE 2 of the drawings, it will be seen that the outermost body members 12 and 12A have chambers 30 and 30A therein on the opposite outer sides of the diaphragms 26 and 26A respectively, and which chambers 30 and 30A respectively communicate with the pilot valve by means of vertical and horizontal passageways 31 and 31A respectively.

The chambers 23 and 23A which are on the inner sides of the diaphragms 26 and 26A communicate by way of vertical passageways 32 and 32A with exhaust ports 33 and 33A in the base member 11 as heretofore referred to. The chambers 16A and 16B also communicate with vertical passageways 34 and 34A, which in turn communicate with ports 35 and 35A, respectively, in the base body member 11.

The pilot valve portion of the four-way air valve disclosed herein includes the central portion 20 heretofore referred to and having the transverse passageway 21 with its annular valve seats 22 and 22A at the opposite outer ends thereof and the pilot valve includes body portions 36 and 36A positioned on either side of the central body portion 20 of the pilot valve and having chambers 37 and 37A in communication with the annular valve seats 22 and 22A respectively. The chambers 37 and 37A extend transversely of the body portions 36 and 36A, respectively, and are controlled by secondary conical valve seats 38 and 38A, respectively, which are arranged in oppositely disposed relation to the valve seats 22 and 22A, respectively, heretofore described.

The chambers 37 and 37A extend beyond the valve seats 38 and 38A and enlarge into chambers 39 and 39A. Annular grooves 40 and 40A formed in the outer surfaces of the body portions 36 and 36A sealingly receive and support secondary diaphragms 41 and 41A, and the diaphragms 41 and 41A have cup-shaped center sections 42 and 42A which engage and support the opposite ends of a secondary spindle 43. The secondary spindle 43 extends through the passageways 37, 37A and 39 and 39A and has areas of reduced diameter spaced inwardly from the ends upon which areas polyethylene spheres 44 and 44A are disposed so as to be self-retentive thereon.

It will thus be seen that the secondary spindle 43 with its polyethylene spheres 44 and 44A float in the pilot valve and so that the spheres 44 and 44A may be moved to seat either in the conical valve seats 22 and 38A, as illustrated in FIGURE 2 of the drawings, or alternately seat in the conical valve seats 38 and 22A, respectively.

In order that the secondary spool 43 may be moved to effectively move the spheres 44 and 44A, as just described, a coil spring 45 is caged in a body member 46 which forms a closure and an extension on the righthand end of the pilot valve assembly, and the one end of the coil spring 45 directly engages the end of the secondary spool 43. The opposite end of the spool 43 is engaged by a soleroid 47 which is positioned on the opposite or left side of the pilot valve, as seen in FIGURES 1 and 2 of the drawings. Electrical conductors 48 extend from the solenoid to a suitable power source (not shown) so that the solenoid may be energized whereupon it will move the spheres 44 and 44A and the spool 43 to the position illustrated in FIGURE 2 of the drawings. Upon de-energization of the solenoid 47, the spring 45 will move the spool 43 and the spheres 44 and 44A to the left and into seating engagement with the conical valve seats 38 and 22A respectively.

It will thus be observed that the solenoid actuated pilot valve effectively controls the positioning of the main spool 28 and the spherical valve elements 29 and 29A thereon, and which valve elements comprise the actuating portions of the four-way air valve disclosed herein.

It will be observed that the chambers 30 and 30A heretofore referred to as being formed in the body members 12 and 12A respectively communicate with the chambers 37 and 37A by way of the passageways 31 and 31A, and that the air introduced into the chambers 30 and 30A is therefore under the control of the secondary spool 43 and the spherical valves 44 and 44A thereon.

In operation, air under suitable pressure is connected with the valve inlet 19 in the base 11 and the air pressure thus extends upwardly through the vertical passageway 18 as well as into the transverse passage or chamber 16 in the central body member 10.

As illustrated in FIGURE 2, the solenoid 47 has been energized and the spool 43 and its spherical valve elements 44 and 44A have moved to the right and seated in the conical valve seats 22 and 38A. Air pressure from the passageway 18 which communicates with the transverse passageway 21 in the central portion 20 of the pilot valve, therefore flows through the passageway 21 into the chambers 37 in the body portion 36A of the pilot valve and downwardly through the passageway 31A into the chamber 30A in the four-way air valve, and more particularly in the body section 12A thereof. This air pressure then moves the diaphragm 26A to the left and hence moves the spool 28 and the spherical valve elements 29 and 29A thereon into closed relation with the valve seats 24 and 17A respectively. Thus, the air pressure from the inlet 19 can flow through the chamber 16 in the central body member 10 through the open valve seat 17 and into the chamber 16A and downwardly through the passageway 34 and outwardly of the port 35 to the air cylinder or other device under the control of the four-way valve. Simultaneously, the exhaust port 33 which is in communication with the same air cylinder will be closed by reason of the positioning of the sphere 29 in the conical valve seat 24 and thereby closing the communicating passageway 32 in the body member 13. While this has occurred, a similar action occurs in the righthand portion of the four-way air valve as seen in FIGURE 2 of the drawings, as the exhaust port 33A is opened via the passageway 32A, the chamber 23A, the chamber 16B and the passageway 34A so that a second air cylinder may be effectively controlled by the four-way air valve.

In order to reverse the operation of the controlled air cylinders, the solenoid 47 is de-energized whereupon the pilot valve and more particularly the spherical valve elements 44 and 44A are moved to the left, as seen in FIGURE 2 of the drawings, by the coil spring 45 heretofore described. When this occurs, the air pressure in the transverse passageway 21 of the pilot valve can no longer flow through the chamber 37A, the passageway 31A and into the chamber 30A in the four-way valve body 12A, and instead it can and will flow into the chamber 37 and via the passageway 31 into the chamber 30 in the four-way valve body 12. This action will flex the diaphragm 26 and move the spool 28 and its spherical valve elements 29 and 29A to the right and into seating position in the conical valve seats 17 and 24A respectively.

The air cylinders or the devices under the control of the four-way valve will thus reverse their operation as the respective supply and exhaust ports 35 and 33, and 35 and 33A conduct the compressed air in an opposite manner from that heretofore described.

Those skilled in the art will thus observe that the four-way valve has been disclosed which possesses the novel characteristics of floating spools carrying spherical valve elements arranged to seat in oppositely disposed conical valve seats and that this arrangement of the spherical valve elements and the conical valve seats is such that dirt, scale, oil or other contaminating material in the air supply handled by the four-way air valve will simply be blown off the seats each time the valve reverses. The action is, therefore, quite similar to a poppet valve in that the air pressure acts to keep the valve seat clean, and in the event contaminating materials come between the spherical valve elements and the conical valve seats, the resiliency of the spherical valve elements will compensate therefor and effect a suitable closure.

It will further be seen that the four-way air valve can be efficiently formed of an assembly of relatively simply machined parts. The four-way valve body 10 directly receives on its opposite sides duplicates of the body members 13 and 13A and they in turn receive duplicates of the body members 12 and 12A. The pilot portion of the four-way air valve is similarly formed as the central body portion 20 receives the duplicate oppositely disposed body portions 36 and 36A and they in turn receive the cap 46 and the solenoid 47 on their opposite outer sides to complete the assembly. All of the several body members of the body portions are sealingly assembled with respect to one another by reason of O-ring seals 14 positioned in appropriate annular grooves about each of the contacting surfaces of the several body members and body portions.

It will thus be seen that a four-way air valve has been disclosed which meets the several objects of the invention and having thus described my invention, what I claim is:

1. A four-way air valve having a single inlet port arranged to be placed in communication with a source of air pressure and two pairs of supply and exhaust ports arranged to be placed in respective communication with a pair of air cylinders or the like, communicating transverse and longitudinal passageways in said four-way air valve and two pairs of spaced valve seats formed in said longitudinal passageway and positioned with one pair of said oppositely disposed valve seats on either side of said transverse passageway, the opposite ends of said longitudinal passageway forming diaphragm chambers, diaphragms sealingly positioned across said diaphragm chambers, a spool supported on said diaphragms and extending axially of said longitudinal passageway, resilient valve elements positioned on said spool in spaced relation and with one of said resilient valve elements between each pair of said oppositely disposed valve seats in said longitudinal passageway, secondary passageways communicating with each of said exhaust and supply ports and with said longitudinal passageway on either side of the outermost one of each of said pairs of oppositely disposed valve seats in said longitudinal passageway, and inwardly of said diaphragms, a pilot valve in communication with said four-way air valve for controlling the same, said pilot valve including a body member sealingly engaged on said four-way air valve, passageways in said pilot valve body member and said four-way air valve establishing communication between said diaphragm chambers and said pilot valve, a secondary longitudinal passageway in said pilot valve, two pairs of spaced oppositely disposed valve seats in said secondary passageway, diaphragm chambers in the opposite ends of said secondary passageway, secondary diaphragms positioned across said diaphragm chamber in sealing relation, a secondary spool positioned of said secondary longitudinal passageway, secondary valve elements on said secondary spool, said secondary valve elements positioned one between each of said pair of oppositely disposed valve seats in said secondary longitudinal passageway, said passageways establishing communication between said diaphragm chambers in said four-way air valve and said pilot valve communicating with the areas between the oppositely disposed pairs of valve seats in said longitudinal passageway of said pilot valve, and a passageway in said pilot valve communicating with said transverse passageway in said four-way air valve and the area between said spaced pairs of valve seats in said secondary longitudinal passageway in said pilot valve and means on said pilot valve for moving said secondary spool and secondary valve elements thereon in a reciprocal motion to position said secondary valve elements in sealing or open relation to said oppositely disposed valve seats in each of said pairs of said valve seats in said pilot valve.

2. The four-way air valve set forth in claim 1 and wherein the means on said pilot valve for moving said secondary spool and secondary valve elements thereon comprises a solenoid engaging one end of said secondary spool and a coil spring engaging the other end thereof and positioned beyond said diaphragms.

3. The four-way air valve set forth in claim 1 wherein the resilient valve elements and the secondary valve elements are spherical in shape.

4. A four-way air valve having a single inlet port arranged to be placed in communication with a source of air pressure and two pairs of supply and exhaust ports arranged to be placed in respective communication with a pair of air cylinders or the like, communicating transverse and longitudinal passageways in said four-way valve and two pairs of spaced oppositely disposed valve seats formed in said longitudinal passageway and positioned with one pair of said oppositely disposed valve seats on either side of said transverse passageway, the opposite ends of said longitudinal passageway forming diaphragm chambers, diaphragms sealingly positioned across said diaphragm chambers, a spool supported at its ends in the mid portion of said diaphragms and extending axially of said longitudinal passageway and movable axially by said diaphragms, spherical faced valve elements positioned on said spool in spaced relation and with one of said spherical faced valve elements between each pair of said oppositely disposed valve seats in said longitudinal passageway, secondary passageways communicating with each of said exhaust and supply ports and with said longitudinal passageway on either side of the outermost one of each of said pairs of oppositely disposed valve seats in said longitudinal passageway, and inwardly of said diaphragms, and means for moving said spool longitudinally, and each of the valve seats of each of said pairs of spaced valve seats being, frusto-conical and arranged with their largest diameters toward one another.

5. The four-way air valve set forth in claim 4 and wherein the device for directing the air pressure into said diaphragm chambers comprises a solenoid actuated pilot valve in communication with said diaphragm chambers.

References Cited
UNITED STATES PATENTS

| | | | |
|---|---|---|---|
| 2,966,890 | 1/1961 | Panissidi | 137—625.64 |
| 3,139,109 | 6/1964 | Ruchser | 137—596.16 |
| 3,180,347 | 4/1965 | Henderson | 137—625.64 |
| 2,219,359 | 10/1940 | Goit et al. | 251—31 |

FOREIGN PATENTS

| | | |
|---|---|---|
| 1,386,379 | 12/1963 | France. |
| 1,206,129 | 5/1958 | France. |
| 854,474 | 4/1939 | France. |
| 517,380 | 2/1955 | Italy. |

M. CARY NELSON, *Primary Examiner.*

ROBERT J. MILLER, *Assistant Examiner.*